Patented Sept. 25, 1928.

1,685,451

UNITED STATES PATENT OFFICE.

GEORGE E. GEBHARDT, OF MUSCATINE, IOWA.

METHOD OF TREATING PEARL CHIPS AND PRODUCT.

No Drawing.   Application filed December 21, 1927.  Serial No. 241,721.

My invention relates to the treatment of fish shells, such as clam, mussel, or oyster shells, so that their beauty is increased and rendered suitable for decorative purposes.

The fish shells are preferably obtained from the waste clam or mussel shells from pearl button factories, after the button blanks have been cut therefrom. These waste shells are collected in large quantities and preferably stored in a shed or warehouse.

The first step in the process consists in passing these fish shells into a crusher, wherein they are crushed or broken up into various sizes, running from the size of fine flakes or grains to that of chips about the size of a pea, more-or-less.

The next step in the process consists in running the broken or crushed fish shells through a screener or separator. This screener or separator preferably separates the shells in five different sizes. The different sizes or grades of pearl shell chips are thus obtained and may be employed in the subsequent treatment. These grades run from fine flakes or grains to aggregates of varying sizes, as stated.

The next step in the process consists in introducing the selected size of pearl shell chips into a churn or agitator. This agitator or churn preferably embodies a revolving cylinder which may hold about four hundred pounds of chips. This cylinder is closed to the atmosphere, and as they are being subjected to rotation or agitation, live steam is introduced into the churn or receptacle, and the pearl chips are heated to a temperature of about 200° F. This heat treatment is maintained for about thirty minutes, which is ordinarily sufficient to cause the entire mass of the pearl chips to be heated to about 200° F.

When the pearl chips are thus heated to 200° F., the cover or the revolving receptacle may be removed, and about two pounds of powdered pumice stone and two pounds of caustic soda, are introduced into the cylinder, and the cover again closed. The cylinder is again rotated for effecting the agitation of the pearl chips, in the presence of the pumice stone and caustic soda, the temperature of the pearl chips being preferably maintained about 200° F. by means of the live steam treatment. This agitation and treatment is continued for about from three to six hours, according to the length of time required for the pumice stone to grind down the rough spots, sharp edges, black spots, et cetera, upon the shell chips.

After this grinding or polishing treatment in the presence of the alkali, namely, the caustic soda, the pearl chips are dumped from the revolving receptacle and thoroughly washed to remove all traces of the pumice stone and the caustic soda. The washing may be effected by placing the pearl chips in a screen drum of a suitably fine mesh, and rotating the same, while applying water to the same, the water being allowed to drain from the pearl chips and thus carry off the pumice stone and caustic soda.

The polished and washed pearl chips are next introduced into a dye vat. This dye vat may be in the form of a steel tank, large pottery jar, or barrel. The tank is preferably filled one-third full of water, which is heated to a temperature of about 175° F. and aniline dye of a suitable color is introduced into the heated water. In treating four hundred pounds of pearl chips, I would use thirty-two pounds of water having added thereto one-half of a pound of aniline dye. The use of aniline dye is preferred as it more readily penetrates into the pores and crevices of the pearl chips. I also prefer to add to the thirty-two pounds of water one pound of silica, and also one pound of hydrogen peroxide. The hydrogen peroxide has a tendency to open the pores of the pearl chips and lead in the aniline dye. As before stated, the pearl chips are introduced into this liquid and remain submerged therein for a period of about ten to twenty hours, without agitation, depending upon the desired dye condition to be obtained.

After this dyeing step, the pearl chips are removed from the tank or vat and introduced into a washing device, preferably embodying a rotatable screen drum of suitably fine mesh. While being thus rotated, water is applied to the pearl chips and the surplus dye and other chemicals are thoroughly washed from the pearl chips to remove all traces of the same from the pearl chips.

After being thus washed, the next step in the process consists in placing the pearl chips in a vat or tub, containing sufficient water to just cover the pearl chips. I have found that one part by weight of the pearl chips should be added to sixteen parts of weight of water. I then introduce sulphuric acid into this water, preferably one part by weight of sulphuric acid to sixteen parts by weight of water, and the entire mass is agitated or churned, for about two hours. This treatment, in the presence of the acid, serves to polish the pearl chips.

The pearl chips are now removed from the acid solution and thoroughly washed to remove all traces of acid, and are then introduced into water, heated to about 200° F. This heat treatment is maintained for about one hour and fifteen minutes and the temperature is maintained at about 200° F. About eight parts of water are used to about sixteen parts by weight of pearl chips, and about two or three ounces of muriatic acid is added to the sixteen parts by weight of water in the presence of the pearl chips. This gives the pearl chips the desired added finish, holds the polish and fixes the dye.

The next step in the process is dumping or removal of the pearl chips thus treated without washing into revolving driers, preferably of the screen type, and while in these driers, the pearl chips are subjected to the heat treatment of 212° F. for ten minutes until they are thoroughly dried.

The next step is to subject the pearl chips to a buffer action. I provide a rotatable barrel or drum, which is preferably filled one-third with sawdust, and one-third with the shell chips. I may employ one hundred and fifty pounds by weight of sawdust to four hundred pounds by weight of the pearl chips and I add from one to ten ounces of citric acid and from one to ten ounces of bees wax, to the sawdust. The bees wax is finely divided and the citric acid and bees wax are thoroughly mixed with the sawdust. The agitation of the pearl chips in the sawdust is continued for about an hour which produces a high lustre or polish on the pearl chips.

The next step in the process is to thoroughly remove the sawdust from the pearl chips, which is effected by introducing the pearl chips into a separator or screener and there subjecting them to agitation, the sawdust being separated from the pearl chips. If the pearl chips are larger than the sawdust, the sawdust passes from the screen drum, but if the chips are smaller, the chips pass from the screen drum. The chips are thus separated and collected. The pearl chips are collected and placed in large porous bags.

If the pearl chips are to be introduced into water, they are next subjected to a waterproof action. This waterproof treatment may be applied to all sizes of pearl chips. When the chips are to be used for interior decoration, where they will not be subjected to the action of water, the waterproofing step may be omitted.

To carry out the waterproofing treatment, the pearl chips are dipped into the vat containing the waterproofing solution by means of the bags containing them, and are then dried upon large screens, by heating the same to about 150° F., for about two hours. The waterproofing liquid is preferably a quick air drying spirit varnish, such as, a varnish containing the usual gum, oil and a drier.

This completes the final step in the process and the pearl chips are now ready to be packed in small bags or boxes of any suitable size, for shipment. It will be found that the pearl chips have acquired an attractive color, which has penetrated into the pores of the pearl chips and they also possess a high luster and are waterproof so that the color remains permanent when the pearl chips are introduced into water.

The term "pearl chips" is intended to cover the ground or broken chips, ranging in sizes from the fine flakes or grains to the relatively large aggregates, of about the size of a pea, more-or-less.

The pearl chips may be used in various ways. They may be introduced into receptacles holding gold fish or into pots containing plants, and for various other ornamental purposes, practical purposes and exterior and interior decorating.

It is to be understood that the form of my invention, herewith described, is to be regarded as a preferred example of the same, and that various changes in the steps of the process may be resorted to and that known chemical equivalents may be employed, without departing from the spirit of my invention, or the scope of the subjoined claims.

Having thus described my invention, I claim:

1. The hereindescribed method of treating pearl chips for increasing their beauty, comprising breaking or crushing pearl shells for producing the pearl chips, subjecting the pearl chips to the action of agitation in the presence of pumice-stone and caustic soda, while maintaining the same at a temperature of about 200° F., washing the pearl chips for removing all traces of the pumice stone and caustic soda therefrom, introducing the pearl chips thus treated into a water solution of an aniline dye in the presence of hydrogen peroxide and heat at a temperature of about 175° F. for a period of about ten to twenty hours, washing the pearl chips for removing the surplus dye and other chemicals, then subjecting the pearl chips to a polishing action by introducing them into water containing sulphuric acid and agitating the mass, thoroughly washing the pearl chips to remove all traces of the sulphuric acid, introducing the pearl chips thus treated into water containing muriatic acid while heating the mass to about 200° F. which imparts to the pearl chips a finish and holds the polish and fixes the dye, drying the pearl chips thus treated, subjecting the dried pearl chips to a buffering action, and applying a water-proofing substance to the pearl chips.

2. The hereindescribed method of treating pearl chips for increasing their beauty, comprising breaking or crushing pearl shells for producing the pearl chips, subjecting the pearl chips to the action of agitation in the presence of pumice stone and caustic soda while maintaining the same at a temperature of about 200° F., washing the pearl chips for removing the pumice stone and caustic soda therefrom, introducing the pearl chips into a water solution of an aniline dye in the presence of hydrogen peroxide and a temperature of about 175° F. for a period of about ten to twenty hours, washing the pearl chips for removing the surplus dye and other chemicals, then subjecting the pearl chips to a polishing action by introducing the same into water containing sulphuric acid and agitating the mass, thoroughly washing the pearl chips to remove the sulphuric acid therefrom, introducing the pearl chips thus treated into water containing muriatic acid while heating the mass to about 200° F., drying the pearl chips thus treated, and subjecting the dried pearl chips to a buffering action.

3. The hereindescribed method of treating pearl chips for increasing their beauty, comprising subjecting the pearl chips to the action of an abrasive material, separating out the abrasive material from the pearl chips, applying to the pearl chips thus treated a liquid dye, washing the chips to remove the surplus dye, subjecting the pearl chips to the action of sulphuric acid, washing the pearl chips to remove the sulphuric acid therefrom, and then subjecting the pearl chips to the action of muriatic acid in the presence of heat.

4. In the method of treating pearl chips for increasing their beauty, as a subcombination, applying to the pearl chips a solution containing an aniline dye and hydrogen peroxide.

5. In the method of treating pearl chips for increasing their beauty, as a subcombination, applying to the pearl chips a solution including an aniline dye, washing the chips thus treated for removing the surplus dye, and introducing the pearl chips thus treated into a water solution of muriatic acid in the presence of heat.

6. As a product, waterproofed dyed pearl chips.

7. The method of treating pearl chips, comprising dyeing pearl chips, polishing the same, and then applying a waterproofing substance to the pearl chips.

8. The hereindescribed method of treating pearl chips for increasing their beauty, comprising polishing the pearl chips, applying to the polished pearl chips a liquid dye, subjecting the dyed pearl chips to the action of a liquid containing an acid, and then treating the pearl chips with a substance which fixes the dye and holds the polish.

9. The method of treating pearl chips for increasing their beauty, comprising polishing the pearl chips, subjecting the pearl chips to the action of a liquid dye in the presence of a substance which tends to open the pores of the pearl chips and lead in the dye, again polishing the dyed pearl chips, and then subjecting the pearl chips to the action of a substance which serves to fix the dye and hold the polish.

In testimony whereof I affix my signature.

GEORGE H. GEBHARDT.